Oct. 21, 1924.  
E. JUILLARD  
1,512,693  
INDUCTION MOTOR  
Filed Oct. 18, 1922
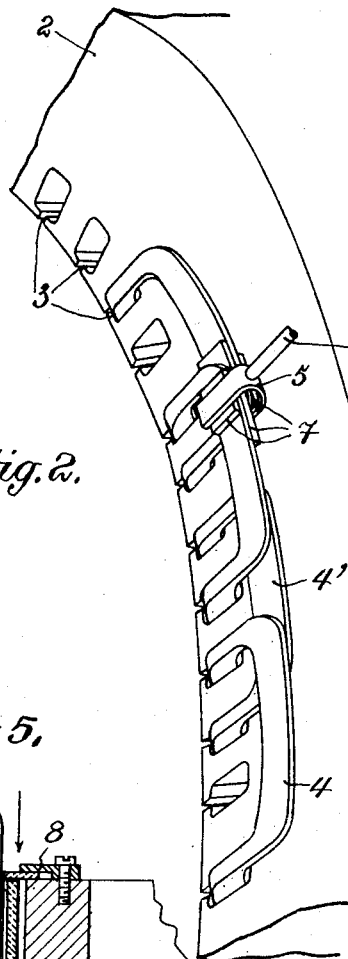
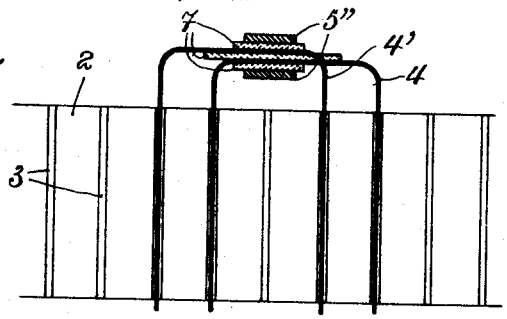
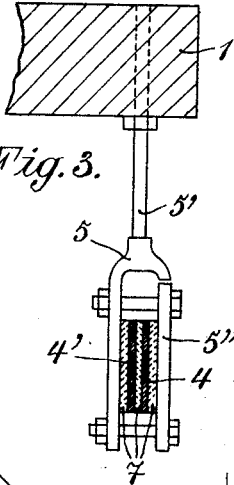
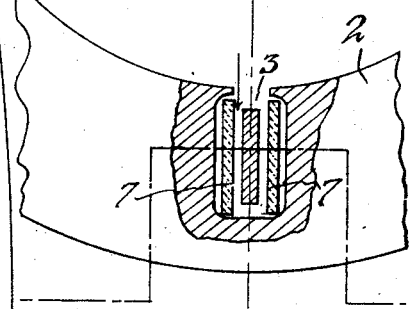
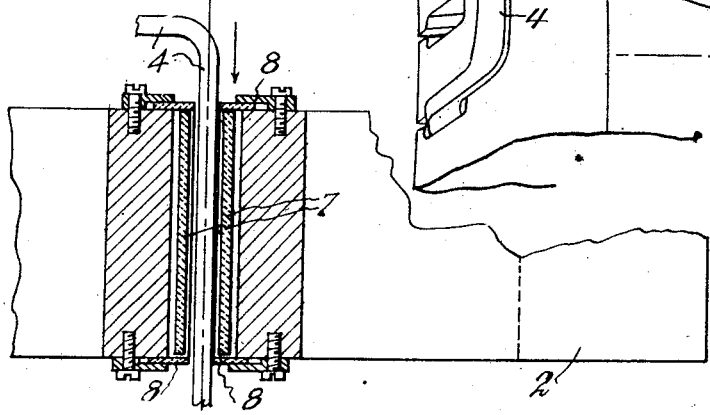
Inventor  
Ernest Juillard  
By Serrell & Son  
his attorneys.

Patented Oct. 21, 1924.

1,512,693

UNITED STATES PATENT OFFICE.

ERNEST JUILLARD, OF GENEVA, CANTON OF GENEVA, CONFEDERATION OF SWITZERLAND, ASSIGNOR TO ATELIERS H. CUÉNOD SOCIÉTÉ ANONYME, OF GENEVA, SWITZERLAND, A CORPORATION OF SWITZERLAND.

INDUCTION MOTOR.

Application filed October 18, 1922. Serial No. 595,407.

*To all whom it may concern:*

Be it known that I, ERNEST JUILLARD, a citizen or Switzerland, residing at Geneva, Canton of Geneva, in the Confederation of Switzerland, have invented certain new and useful Improvements in Induction Motors, of which the following is a specification.

The object of the present invention is an induction motor especially adapted to work under conditions where it is exposed to influences detrimental to its windings. Such influences may have their cause in the great humidity or a very high temperature of the surrounding air or it may be that the motor runs in a room where there are gases or vapours which attack the usual electric insulation of the windings and which sooner or later destroy them, or it may be that the motor is employed for driving a machine near by or coupled with it and from which machine such destructive vapours or gases escape.

The gist of the invention consists in this, that the winding of the stator is—with regard to the iron core of the latter—freely supported at least in the notches of the stator and may also be so on the front faces of the same.

The drawing shows a working form of the invention by way of example.

Fig. 1 is a partial development of the iron core of a stator

Fig. 2 is a partial side view in perspective of a stator

Fig. 3 represents a detail view.

Fig. 4 is a sectional elevation, and Fig. 5 a sectional plan illustrating a modified form of the invention.

The iron core 2 of the stator, in the usual manner, is provided with notches 3 receiving bar-windings 4, $4^1$ which by means of a clamping device 5 fixed to the stator shell 1 are freely supported within said notches and on the front faces of the stator. The corresponding squirrel cage rotor is not represented in the drawing. The clamping device 5 (Fig. 3) comprises first of all a strong rod member $5^1$ fixed to the shell 1 which by means of two clamping plates 5″ arranged to form a fork, embraces the winding bars 4, 4′. The superposed bar-conductors 4, 4′ are tightly clamped and safely held on both front sides of the stator within the clamping plates 5″ by means of safety screws or the like. Between the clamping plates 5″ and the adjoining bar-conductor and between the two superposed bar-conductors 4, 4′ intermediate insulating pieces 7 for instance of mica, are inserted.

As shown in Fig. 1, the bare, freely supported bar-conductors 4, 4′ are insulated from the wall of the notch 3 solely by the surrounding air.

Of course it would also be possible to provide the bar-conductors with a suitable insulation of any kind in order to increase its insulating resistance against the wall of the notches whilst otherwise the conductors are freely supported according to the invention.

It is also possible to increase the insulation resistance over the value corresponding to the simple air insulation by inserting at least at intervals between the side walls of the notches 3 (see Figs. 4 and 5) and the otherwise freely supported conductors 4, 4′ intermediary insulating pieces 7 of mica, fibre, glass, porcelain or the like. At the faces of the stator these insulating pieces are held within the notches 3 by means of circular flat rings or segments 8 which are fastened to the iron core in the manner shown in Fig. 5.

It is of course to be understood that it is quite allowable that the distance between the intermediary insulating piece 7 and the conductor 4 may be less than the one shown in the drawing. It may even casually come into touch with the conductor, if only the insulating pieces 7 are not made use of for regularly clamping or wedging the conductor within the metal.

The clamping device gripping the bar-windings on both front sides of the stator may be constructed in any other suitable manner. If the clamping is effected by screws they may be locked against unscrewing in any known manner. The fixing of the clamping device to the shell may also take place in various ways. Care is only to be taken that the stator-winding is freely supported,—with reference to the iron core of the stator—at least within the notches and eventually also on the front side of the latter.

It is evident that the improvement may be made use of to good advantage in vacuum refrigerating or other similar machines.

I claim as my invention:

1. In an induction motor for operation under conditions where the motor is exposed to influences which by their nature are detrimental to electric insulation and in combination, a stator having notches therein, windings in the said notches, and means for supporting the said windings so that the windings pass freely through the said notches.

2. In an induction motor for operation under conditions where the motor is exposed to influences which by their nature are detrimental to electric insulation and in combination, a stator having notches therein, windings inserted in the said notches, and means for supporting said windings so that the windings pass freely through the said notches and the ends of the windings are spaced from the sides of the stator.

3. In an induction motor for operation under conditions where the motor is exposed to influences which by their nature are detrimental to electric insulation and in combination, a stator having notches therein, windings of bare conductors inserted into said notches, means for supporting said windings of bare conductors within said notches so that said windings pass freely through said notches, and insulating members lying in the notches between the said windings and the walls defining the said notches and in positions spaced from the said bare windings to increase the insulating effect of the air surrounding the portions of the windings within the said notches.

4. In an induction motor for operation under conditions where the motor is exposed to influences which by their nature are detrimental to electric insulation and in combination, a stator having notches therein, a winding inserted in the said notches, and a clamp member fixed to the shell of the stator and adapted to engage the winding at the side of the stator in such a manner that the winding is supported free of the stator as it enters and leaves the said notches and also extends freely through the said notches.

In testimony whereof I have affixed my signature in presence of two witnesses.

ERNEST JUILLARD.

Witnesses:
MAURICE IMER.
L. H. DUFOUR.